United States Patent
Erhart et al.

(10) Patent No.: US 7,526,373 B2
(45) Date of Patent: Apr. 28, 2009

(54) METHOD AND DEVICE FOR REGULATING THE VEHICLE SPEED AND ENGINE SPEED IN A MOTOR VEHICLE HAVING A MANUALLY SHIFTED TRANSMISSION

(75) Inventors: Robert Erhart, Ditzingen (DE); Manfred Hellmann, Hardthof (DE)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 10/513,279

(22) PCT Filed: Mar. 14, 2003

(86) PCT No.: PCT/DE03/00822

§ 371 (c)(1), (2), (4) Date: Dec. 13, 2005

(87) PCT Pub. No.: WO2004/026612

PCT Pub. Date: Apr. 1, 2004

(65) Prior Publication Data

US 2006/0106519 A1 May 18, 2006

(30) Foreign Application Priority Data

Sep. 13, 2002 (DE) ............................... 102 42 684

(51) Int. Cl.
*B60K 31/00* (2006.01)
(52) U.S. Cl. ........................... 701/51; 180/170
(58) Field of Classification Search ............. 701/93–96, 701/110; 180/170, 179, 167, 178, 197, 171; 123/198 D, 360, 350, 399
See application file for complete search history.

(56) References Cited

U.S. PATENT DOCUMENTS

| | | | | |
|---|---|---|---|---|
| 4,698,762 A | * | 10/1987 | Moriya et al. | 701/53 |
| 4,896,267 A | * | 1/1990 | Frantz et al. | 701/97 |
| 5,088,351 A | * | 2/1992 | Miyake et al. | 477/108 |
| 5,166,881 A | * | 11/1992 | Akasu | 701/96 |
| 5,680,309 A | * | 10/1997 | Rauznitz et al. | 701/93 |
| 6,202,780 B1 | * | 3/2001 | Tanaka et al. | 180/179 |
| 6,330,506 B1 | * | 12/2001 | Roulet | 701/93 |

FOREIGN PATENT DOCUMENTS

| | | |
|---|---|---|
| DE | 196 22 638 | 12/1996 |
| WO | WO 00/06410 | 2/2000 |

OTHER PUBLICATIONS

SAE Paper No. 96 10 10 "Adaptive Cruise Control, System Aspects and Developmental Trends", Winner et al., 1996.

* cited by examiner

*Primary Examiner*—Dalena Tran
(74) *Attorney, Agent, or Firm*—Kenyon & Kenyon LLP

(57) ABSTRACT

In a method for regulating the vehicle speed and the engine speed in a motor vehicle having a manually shifted transmission, if the driver actuates the clutch during ongoing speed regulation, an upshift probability is calculated for the possibility that the driver will select the next higher gear step as a target gear and, when the clutch is actuated, the engine speed is regulated according to a time-dependent function selected on the basis of the upshift probability and the target gear, and the speed regulation is resumed after the release of the clutch.

11 Claims, 3 Drawing Sheets

METHOD AND DEVICE FOR REGULATING THE VEHICLE SPEED AND ENGINE SPEED IN A MOTOR VEHICLE HAVING A MANUALLY SHIFTED TRANSMISSION

FIELD OF THE INVENTION

The present invention relates to a method and device for regulating the vehicle speed and engine speed in a motor vehicle having a manually shifted transmission.

BACKGROUND INFORMATION

For motor vehicles, certain methods and devices are conventional with which the speed of the vehicle may be automatically regulated to conform to a desired speed selected by the driver. In adaptive cruise control systems (ACC; adaptive cruise control), moreover, it is possible to automatically adapt the speed to the speed of a vehicle driving in front, which is located, for example, using a distance sensor, e.g., a radar sensor, (SAE Paper no. 96 10 10 "Adaptive Cruise Control, System Aspects and Development Trends", Winner et al., 1996). The control is accomplished by intervention in the drive system and if necessary also by intervention in the braking system of the vehicle. However, in vehicles having manually shifted transmissions, it is not possible for the control function, insofar as it affects the drive system, to be continued when the driver operates the clutch, because then it is no longer possible for the actual speed of the vehicle, which is used as a feedback signal, to be influenced by the control commands of the controller. Therefore, in vehicles having a manually shifted transmission, it has been conventional to switch off the control function or ACC function as soon as the driver operates the clutch. In order to reactivate the control function after a gear change, the driver must enter an appropriate command by hand.

Although it may be desirable to automatically resume the control function after a gear change, the engine speed in this case is generally not adapted to the actual vehicle speed and to the newly selected gear step, so that upon reengagement of the clutch, an irritating and uncomfortable jolt occurs.

SUMMARY

In contrast, a method having the features described herein and a device having the features described herein may provide that after a gear change, it may be possible to resume the control function automatically and at the same time to moderate or completely prevent the jolt upon reengagement of the clutch.

In the method according to an example embodiment of the present invention, if the control function is active, the probability of the driver shifting into the next higher gear step is estimated on the basis of different input variables, such as engine speed, engine torque, estimated road gradient, braking pressure, duration of braking operation, etc. This estimation may occur continuously during the control operation or, at the latest, upon actuation of the clutch. As long as the connection between engine and driving wheels is interrupted, the cruise control is suspended, at least with respect relation to the drive system, and instead the engine speed is controlled according to a time-dependent function, which is selected as a function of the upshift probability and the target gear. If the upshift probability is nearly 1, that is an upshift is almost certain, the engine speed is reduced according to a relatively swiftly dropping function to the value that is determined by the actual speed of the vehicle and the gear step in the anticipated target gear, in other words, in the next higher gear step. The change rate in this context is selected in such a manner that the required target speed is achieved during the normal duration of a clutch actuation, so that upon clutch reengagement, a jolt-free transition into the control mode may be ensured. If, on the other hand, the upshifting probability is less, so that it is uncertain whether the driver actually intends to upshift or downshift, the engine speed is reduced at a lesser change rate. The result is that the target speed determined for the next higher gear will not yet be fully attained upon reengagement of the clutch, so that the speed at the moment of reengagement will be between the previous speed and this target speed. If the driver actually upshifts, a moderate jolt is produced along the lines of an acceleration of the vehicle. If, on the other hand, the driver downshifts, a slight jolt is produced along the lines of a deceleration of the vehicle, but this jolt may turn out to be markedly less than when there is a complete adaptation of the speed to the anticipated target gear, that is, to the next higher gear. The smaller the upshift probability, the more slowly the engine speed is reduced during the actuation phase of the clutch. In the extreme case, when there is a very low upshift probability, the engine speed is kept constant or even increased so that the jolt turns out to be correspondingly less when downshifting.

It may be provided that the engine speed is not increased, but at best is reduced or kept constant, if it is not possible to reliably rule out an upshift. In this case, it may be prevented that a speed increase that is implausible for the driver will occur as soon as the driver operates the clutch with the intent of upshifting. In addition, by using a transmission position sensor or by comparing the engine speed to the rotational speed at the output of the transmission or the wheel speed, it is possible to establish which gear the driver has actually selected, and, if the driver has downshifted, the speed may be automatically increased to a value corresponding to the lower gear step even before the driver releases the clutch, so that even in this case a jolt-free transition may be achieved. This function may be provided in the cases in which it is possible to conclude from the input variables, such as the road gradient, the speed of the vehicle driving in front, etc., that the driver is downshifting in order to be able to accelerate more rapidly or to maintain speed when the gradient is steeper. If, on the other hand, the input variables indicate that the vehicle speed will be further reduced upon reinstatement of the control, it may be provided not to increase the engine speed so that the braking torque of the engine may be utilized. In the cases in which the driver downshifts in order to override the cruise control and to initiate a passing maneuver, the driver will operate the gas pedal upon reengagement of the clutch anyway, so that even in these cases, an automatic increase of the engine speed may be unnecessary.

The time-dependent function according to which the engine speed is reduced when the clutch is operated may be, as desired, either a linear function or even a non-linear function. If the driver keeps the clutch actuated for a very long time, for example, longer than a fixed or variable pre-determined time interval, it may be provided to reduce the engine speed to idle speed.

In an example embodiment, how long the driver keeps the clutch actuated during a gear change is continually recorded while driving, so that an average value for the duration of clutch actuation is obtained that is typical for the driver. The rates of change of the engine speed determined by the time-dependent functions and, when applicable, the length of the time interval after which the speed is reduced to the idling speed may then be determined as a function of this average value so that an adaptation to the driver behavior may be achieved.

An exemplary embodiment of the present invention is illustrated in the drawings and explained in detail more detail in the following description.

DETAILED DESCRIPTION

Figure 1:
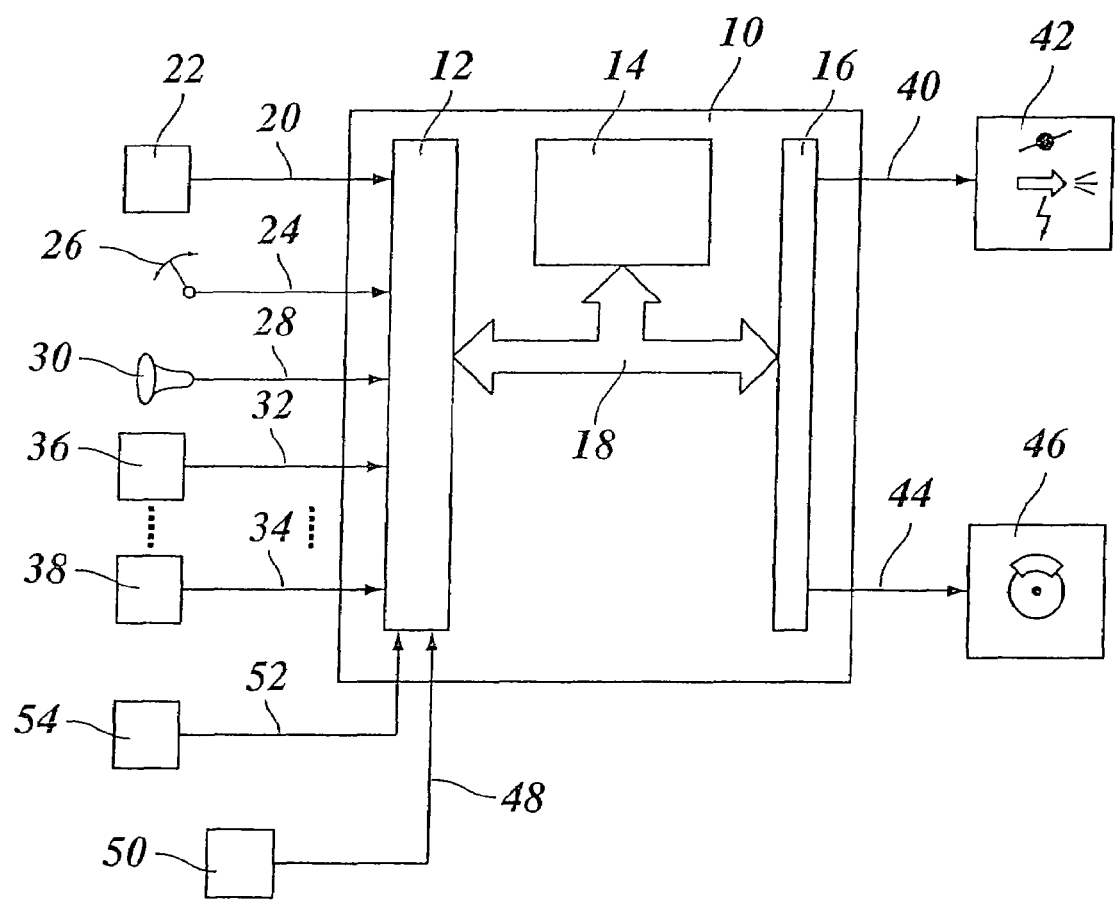
FIG. 1 is a block diagram of a device for cruise control.

FIG. 1 shows a block diagram of a control unit 10 for an adaptive vehicle-speed controller. Control unit 10 in this context includes an input circuit 12, at least one microcomputer 14 and an output circuit 16. These elements are connected to each other via a communication system 18 for data and information exchange. Input lines 20 from a measuring device 22 for registration of the vehicle speed, an input line 24 from a control element 26 operable by the driver for setting the operating state of the vehicle-speed controller and the setpoint distance, and an input line 28 from a distance-measuring device 30, e.g., a radar device, are fed to input circuit 12. A quantity representing the speed of the drive unit and determined by a speed sensor 50 is fed via an input line 48 to input circuit 12, and a clutch actuation signal of a clutch sensor 54 is fed via an input line 52. Furthermore, additional input lines 32 to 34 from measuring devices 36 to 38 for the detection of additional vehicle performance quantities that are used in the adaptive vehicle-speed control are fed to input circuit 12. Performance quantities of this type are, for example, steering angle, transverse acceleration, gear step, etc. In the shown example, measuring device 36 is a rotational-speed comparison device, which provides information about the instantaneous gear step. Control unit 10, there the at least one microcomputer 14, influences the performance of the vehicle's drive unit within the context of the adaptive vehicle speed control via at least one output line 40 and corresponding control elements 42 (e.g., electronic engine control unit). Furthermore, in an exemplary embodiment, control unit 10 influences the braking force at the wheel brakes of the vehicle via an output line 44 and corresponding control elements 46 (e.g., a brake system having ABS/TCS elements).

Figure 2:
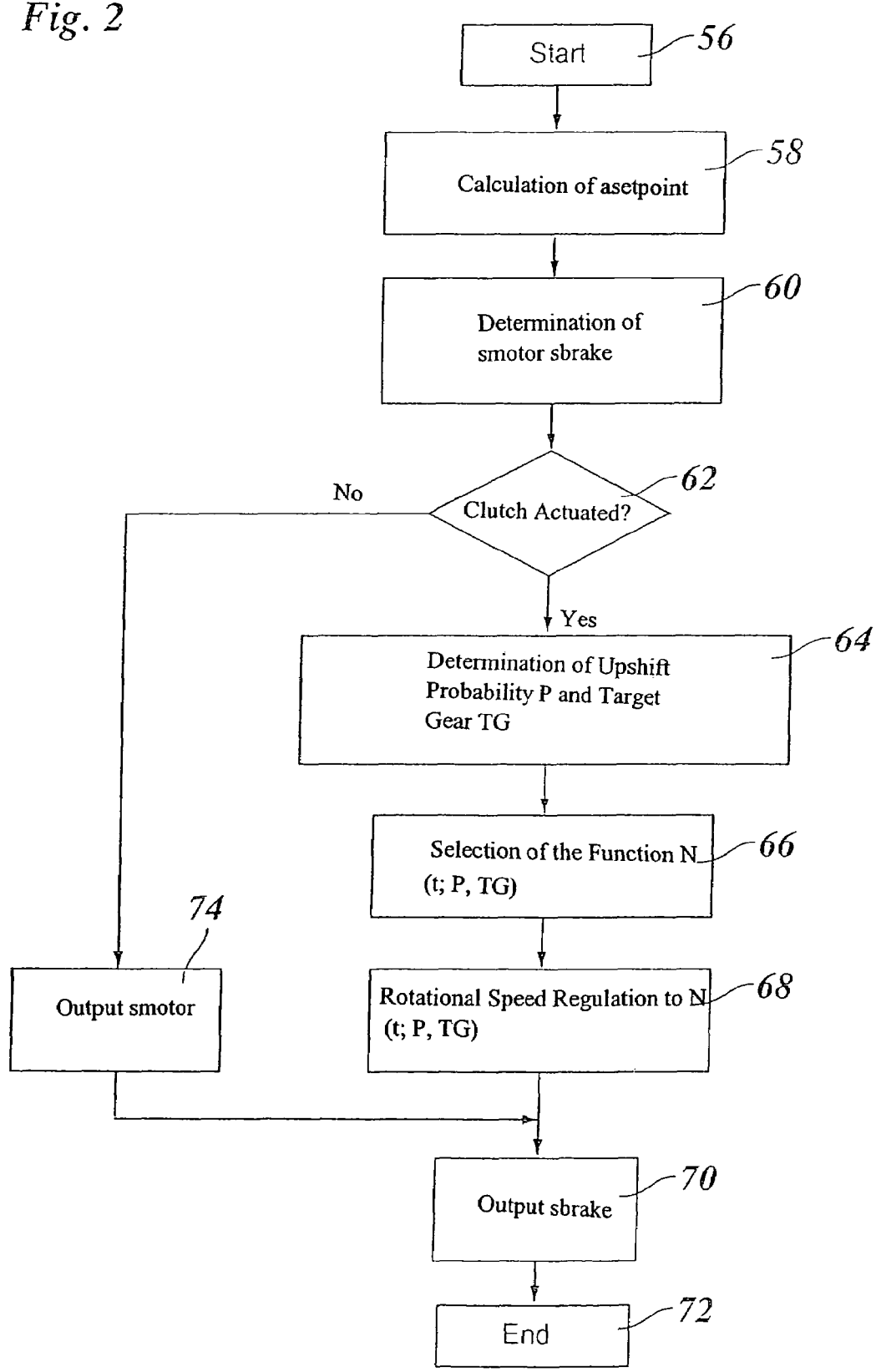
FIG. 2 is a flow chart for illustration of a method for vehicle speed and engine speed regulation.

At block 56 in FIG. 2, a program routine begins that is executed by microcomputer 14 at regular time intervals on the order of several milliseconds. In step 58, a positive or negative setpoint acceleration asetpoint is calculated on the basis of the input variables fed via input lines 20, 24, 28, 32, 34 and, depending on the traffic situation, is used to keep to the desired speed selected by the driver or the distance from the vehicle driving in front. In step 60 a manipulated variable smotor, which is to be fed via output circuit 16 and output line 40 to drive-system control elements 42, is then formed on the basis of setpoint acceleration asetpoint. If a negative setpoint acceleration asetpoint (deceleration) is required and the braking torque that the drive unit is able to generate is insufficient for this deceleration, then in step 60 a manipulated variable sbrake is also formed, which is to be fed via output circuit 16 and output line 44 to control elements 46 of the braking system.

Whether the driver has operated the clutch is then checked in step 62 using the signal of clutch sensor 54. If so, it may be assumed that the driver intends to change gears, but whether the driver wants to increase or reduce the gear step is still unknown. Which gear is selected when the clutch is actuated is known on the basis of the signal of the rotational-speed comparison device. In step 64, an upshift probability P is then calculated that specifies the probability of the driver selecting the next higher gear step as target gear TG. The calculation of this probability is made on the basis of the available input variables, e.g., on the basis of the actual speed of the vehicle, which is made available by measuring device 22, and on the basis of the actual speed of the drive unit communicated by speed sensor 50. Moreover, signals of distance measuring device 30 as well as manipulated variable smotor or other signals made available by the electronic engine control unit that give information about the instantaneous load of the engine, e.g., may also be considered. If, for example, the speed of the engine is already close to the upper limit speed, the transmission is not yet in the highest gear step and, moreover, distance measuring device 30 does not report any obstacles that would provide a cause for a deceleration of the vehicle, then it may be practically certain that the driver intends to upshift, and upshift probability P has the value 1. If, on the other hand, the engine is already running at low speed and the load is relatively high, e.g., on uphill stretches, and/or if a reduction of the vehicle speed is required within the context of distance regulation, it may be almost certain that the driver will downshift, and upshift probability P has the value 0. In other situations, for example, at average speed and average load, upshift probability P will have an average value between 0 and 1 that is to be determined by microcomputer 14 using prescribed criteria.

In an example embodiment, step 64 may also be carried out before step 62. This means that the determination of upshift probability P occurs continuously in each program cycle, so that the upshift probability upon actuation of the clutch is already known. In an example embodiment, it is also possible, on the basis of the continuously checked criteria on which step 64 is based, to output a shift prompt to the driver if a gear change is presented based on the instantaneous engine operating conditions. In this case, it may simply be assumed, upon determination of the upshift probability in step 64, that the driver will heed the shift prompt.

In step 66, a function that describes the time-dependency of drive-unit setpoint speed N is then determined on the basis of upshift probability P and on the basis of target gear TG. In step 68, the drive-unit speed is then regulated to the setpoint value given by this function. Depending on the arrangement, this regulation may occur in microcomputer 14, in that the actual rotational speed received via input line 48 is compared to the setpoint speed, and a corresponding control command is output via output line 40, or the setpoint speed is simply output via output line 40 and the actual speed control remains left to the electronic engine control unit.

If in step 60 a value other than 0 was determined for manipulated variable sbrake, then following step 68 this manipulated variable is output in step 70 to control elements 46 of the brake system before the program cycle is terminated at block 72.

If, on the other hand, it was determined in step 62 that the driver has not actuated the clutch, then steps 64 to 68 are skipped and instead manipulated variable smotor is output in step 74 to control elements 42 of the drive system, before step 70 is carried out.

Thus, as long as the clutch is not actuated, the adaptive cruise control operates by intervening in the drive system (step 74) and/or in the brake system (step 70). However, in the operational phases in which the driver keeps the clutch actuated, the adaptive cruise control is only partially deactivated in the method described here, that is, only intervention in the drive system is stopped, while, if necessary, an intervention in the brake system is still possible. Via this example embodiment of the method, the driver is substantially unburdened, e.g., in situations in which the vehicle driving ahead brakes relatively forcefully. The driver is able then to downshift calmly in order to select a gear step corresponding to the lower speed without the automatic braking of his own vehicle being interrupted during the shift operation and the actuation of the clutch.

The selection of the time-dependent function for the setpoint speed in step 66 has the purpose of automatically adapting the speed during the phase in which the clutch is actuated to the speed corresponding to the anticipated new gear so that when the clutch is released, a transition that is as jolt-free as possible may be achieved. If upshift probability P is greater than 0, then target gear TG is a gear step higher than the currently selected gear, and the speed function is selected in such a manner that the engine speed is brought nearer to the value that results from the actual speed of the vehicle and the gear step in the target gear.

Figure 3:
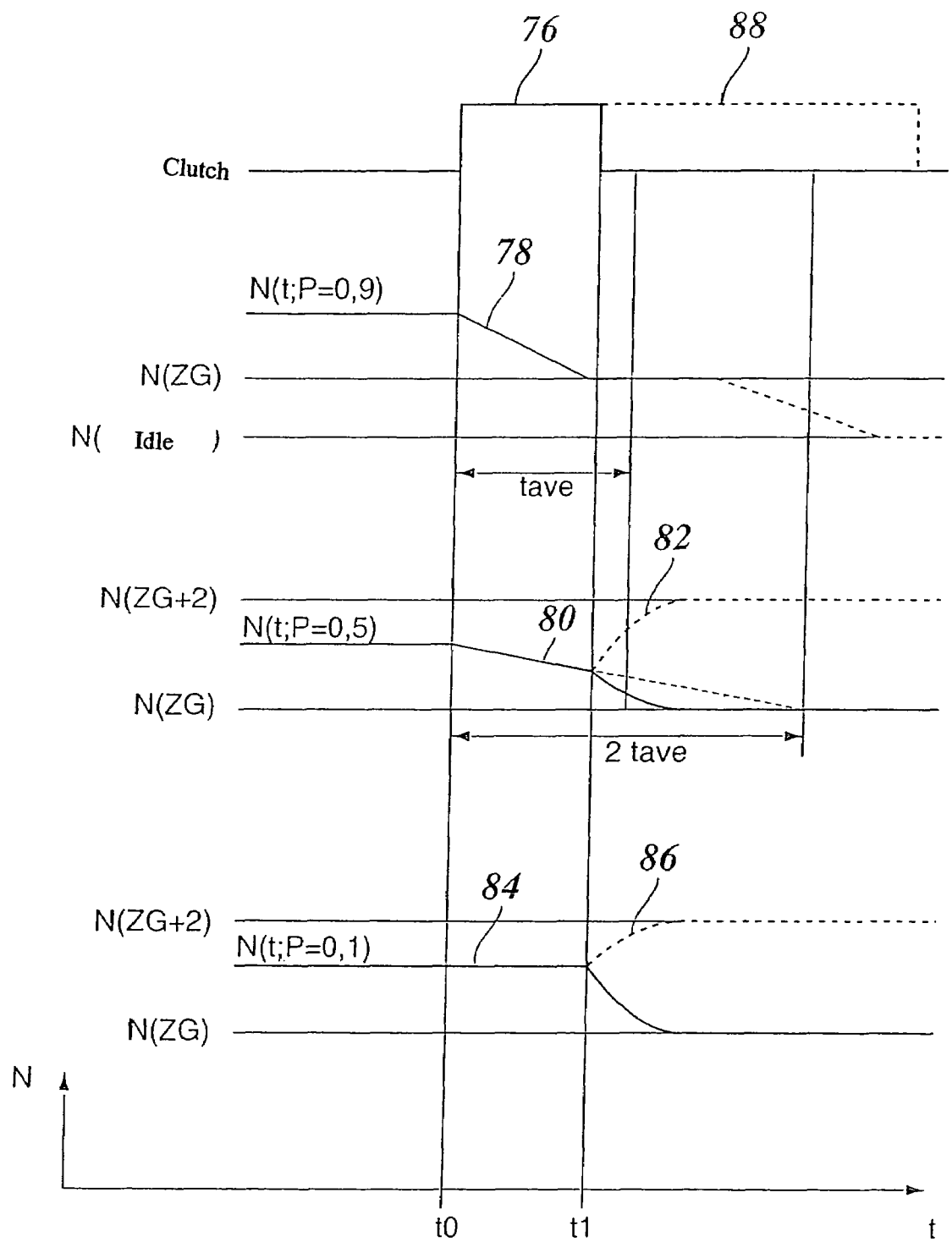
FIG. 3 shows a timing diagram for illustration of different setpoint speed curves in the regulation of the engine speed.

Graphically represented in FIG. 3 are examples for possible time-dependent curves of the setpoint speed function at different upshift probabilities P. Top curve 76 in FIG. 3 represents the signal of clutch sensor 54. The clutch is actuated at time t0 and released again at time t1. Curve 78 represents the time-dependent change of setpoint speed N for the case in which a high upshift probability P has been calculated (P=0.9). Upon actuation of the clutch at time t0, the setpoint speed is equal to the actual engine speed, which is determined by the actual speed of the vehicle and the gear step in the previous gear. After time t0 the setpoint engine speed and, thus, also the actual engine speed is reduced at a relatively steep ramp to value N(TG), which is determined by the actual vehicle speed and the transmission ratio in the target gear, that is, in the next higher gear step. Once this value is reached, the engine speed is kept constant so that upon reengagement of the clutch at time t1, a jolt-free transition may occur.

In the determination of engine speed N(TG), changes of the actual vehicle speed that occur within the time interval between t0 and t1 because of, for example, the declivity or acclivity of the road or because of a braking maneuver (step 70) are also considered. The ramp steepness (dN/dt) of the speed function is adapted in each case so that target speed N(TG) is reached within a certain time span, which is a function of upshift probability P.

Curve 80 represents the case in which upshift probability P has an average value (P=0.5). In this case, the ramp steepness is reduced in such a manner that target speed N(TG) is only reached within a greater time span. In this context, it is accepted that at the time of clutch reengagement at t1, the target speed will have not yet been fully reached, so that a moderate jolt occurs. However, in the case in which the driver is not upshifting, but rather downshifting, there is still a higher engine speed at the moment of clutch reengagement so that the jump from the instantaneous speed to the higher speed N(TG+2), which corresponds to the next lower gear, turns out to be smaller. In this manner, a transition having diminished jolt may also be achieved when downshifting, as is illustrated by dashed curve 82.

The lower upshift probability P is, the more slowly the setpoint speed is reduced. Curve 84 illustrates the case of a very low upshift probability (P=0.1). In this case the setpoint speed during the actuation duration of the clutch is kept constant so that the jolt during the now more probable downshifting turns out to be even less (curve 86), while, in the case in which the driver instead upshifts, a somewhat greater jolt is then accepted.

In FIG. 3, a time interval tave is drawn that corresponds to the driver-specific average duration of clutch actuation known from previous clutch actuations. In the example described here, the ramp slope (dN/dt) of the setpoint engine speed function is dependent not just on upshift probability P, but also on empirical value tave. The time interval within which, after actuating of the clutch, the speed is adapted to relevant target speed N(TG) is given in each case by a specified percentage of tave that is a function of P. Given great upshift probability (curve 78), this time span is, for example, 75% of tave. In this manner, a jolt-free transition may be achieved also in the case in which, as in the example shown here, the actual duration of clutch actuation is somewhat smaller than average value tave.

When there is lower upshift probability, for example, when P=0.5, the time span for the speed adaptation in the shown example is 2*tave. This means that the speed difference between the output speed and the target speed has been precisely reduced to one-half when the driver releases the clutch again after the average time of actuation tave. In this manner, a transition having diminished jolt may be achieved both when upshifting and when downshifting.

If the driver keeps the clutch actuated for a very long time, as is indicated by dashed curve 88, then the speed is reduced further to idle speed N(idle) after expiration of a specified time interval following the clutch actuation (at t0), in the shown example after 1.5*tave.

Because in the method described here the adaptive cruise control remains latently active during the actuation phase of the clutch as well (steps 58, 60 and 74 in FIG. 2), situations may also be detected in which it is foreseeable that, upon reengagement of the clutch and, thus, upon unrestricted resumption of cruise control, a deceleration of the vehicle is required and, thus, a high braking torque of the engine is desirable. In this case, a setpoint speed function may be selected in such a manner that the speed is already brought back to idle speed N(idle) within a brief time after actuation of the clutch, so that a high braking torque of the drive system is available after the clutch reengagement.

What is claimed is:

1. A method for regulating a vehicle speed and an engine speed in a motor vehicle having a manually shifted transmission, comprising:
   if a driver actuates a clutch during an ongoing vehicle speed regulation, calculating an upshift probability for a possibility that the driver will select a next higher gear step as a target gear;
   when the clutch is actuated, regulating the engine speed according to a time-dependent function on the basis of the upshift probability and the target gear; and
   resuming the vehicle speed regulation after release of the clutch.

2. The method according to claim 1, further comprising selecting the time-dependent function corresponding to one of (a) holding constant and (b) reducing the engine speed.

3. The method according to claim 1, wherein each time-dependent function describes a change of the engine speed, within a predetermined time span, to a target engine speed in accordance with an actual speed of the vehicle and the target gear.

4. The method according to claim 3, wherein a length of the predetermined time span is inversely proportional to the upshift probability of the time-dependent function.

5. The method according to claim 3, further comprising forming an average value from a clutch duration occurring in repeated clutch actuations, the predetermined time spans proportional to the average value by a proportionality factor that is a function of the upshift probability.

6. The method according to claim 1, further comprising reducing the engine speed to an idle speed if the clutch remains actuated during a specified time interval.

7. The method according to claim 6, wherein the specified time interval is proportional to an average value formed from a clutch duration occurring in repeated clutch actuations.

8. The method according to claim 1, further comprising measuring, by a distance measuring device, a distance of the vehicle from a vehicle that is driving in front, the vehicle speed regulated based on the distance.

9. The method according to claim 8, further comprising continuing the speed regulation based on the distance during a duration of the clutch actuation by intervention in a brake system of the vehicle and without intervention in a drive system of the vehicle.

10. A device for regulating a vehicle speed and an engine speed in a motor vehicle having a manually shifted transmission, comprising:
- a measuring device configured to measure an actual speed of the vehicle and the engine speed;
- a clutch sensor; and
- a control unit configured to output, as a function of signals from the measuring device, manipulated variables to control elements of at least one of a drive system and a braking system of the vehicle, the control unit configured to:
  - if a driver actuates a clutch during an ongoing vehicle speed regulation, calculate an upshift probability for a possibility that the driver will select a next higher gear step as a target gear;
  - when the clutch is actuated, regulate the engine speed according to a time-dependent function on the basis of the upshift probability and the target gear; and
  - resume the vehicle speed regulation after release of the clutch.

11. A device for regulating a vehicle speed and an engine speed in a motor vehicle having a manually shifted transmission, comprising:
- a measuring device configured to measure an actual speed of the vehicle and the engine speed;
- a clutch sensor; and
- a control unit configured to output, as a function of signals from the measuring device, manipulated variables to control elements of at least one of a drive system and a braking system of the vehicle, the control unit configured to perform a method including:
  - if a driver actuates a clutch during an ongoing vehicle speed regulation, calculating an upshift probability for a possibility that the driver will select a next higher gear step as a target gear;
  - when the clutch is actuated, regulating the engine speed according to a time-dependent function on the basis of the upshift probability and the target gear; and
  - resuming the vehicle speed regulation after release of the clutch.

* * * * *